June 12, 1951 G. B. DAVIS 2,556,319
DEAERATING TANK
Filed Aug. 8, 1947 2 Sheets-Sheet 1

INVENTOR.
GLENN B. DAVIS
BY
Richard W. Treverton
ATTORNEY

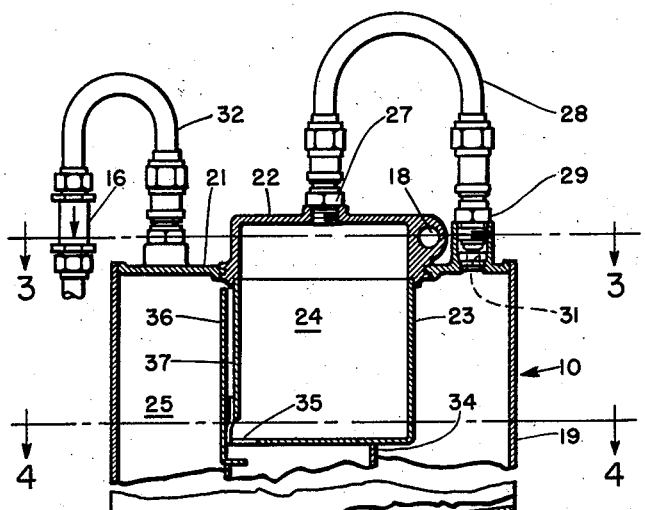
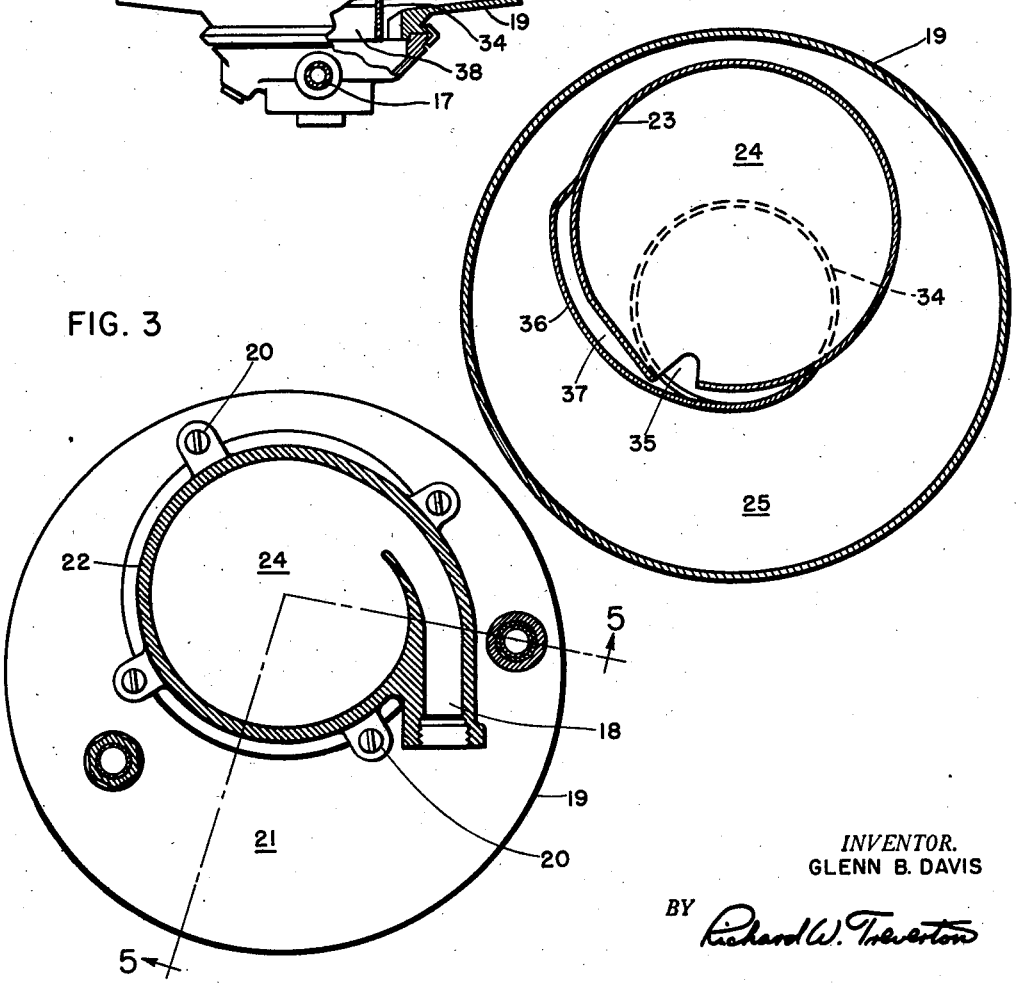

Patented June 12, 1951

2,556,319

UNITED STATES PATENT OFFICE 2,556,319

DEAERATING TANK

Glenn B. Davis, Columbus, Ohio, assignor to Curtiss-Wright Corporation, a corporation of Delaware Application August 8, 1947, Serial No. 767,555

8 Claims. (Cl. 183—2.51)

1

This invention relates to a tank provided with deaerating means, and especially such a tank for engine lubricating oil or similar liquids.

The lubricating oil for engines, particularly for gas turbines of the kind now used in aircraft, entrains a large quantity of air or other gases as it is circulated through the engine lubricating passages. As a result the oil discharging from these passages contains or comprises oil froth which in some cases may be many times the volume of the original oil; and, in order to receive the discharged oil in a tank of reasonable dimensions and to render it fit for recirculation through the engine as a lubricant, the air must be removed from it.

The present invention contemplates a tank separated into one upper and two lower chambers, the upper one serving primarily for deaeration. One lower chamber is intended primarily for containing deaerated liquid to be immediately re-used and the other lower chamber for containing make-up liquid, i. e. liquid to replenish that which is lost or consumed during circulation through the system. By this arrangement the greater part of the gas separation takes place in the upper chamber, and the separated gases are not required to pass by or through the larger masses of liquid in the lower chambers.

The invention further contemplates use of the separated gases to provide a pressure upon the liquid in the lower chambers, for improving return flow from the tank to the connected circulatory system.

The foregoing and other objects and advantages will become apparent from the following description of the typical embodiment of the invention shown in the accompanying drawings, wherein.

Figures 3 and 4 are sectional views taken in horizontal planes indicated respectively by line 3—3 and line 4—4 in Figure 5; and, Figure 5 is a sectional view taken approximately along the vertical planes indicated by line 5—5 in Figure 3.

Figure 2:
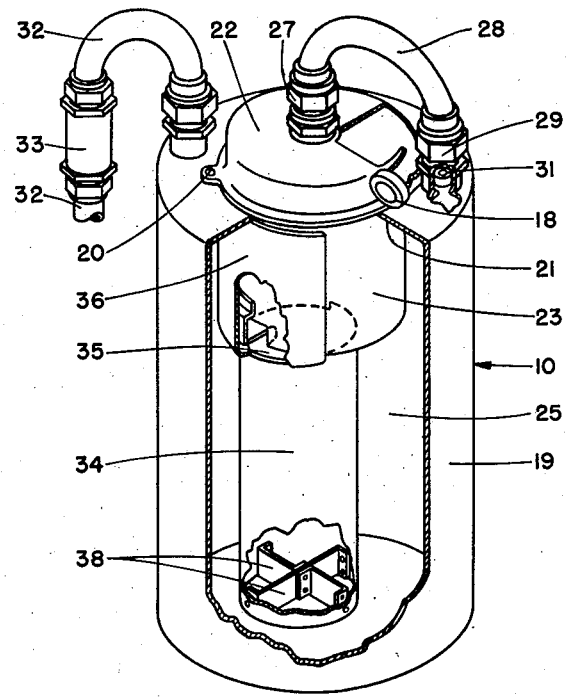
Figure 2 is a perspective view of the tank with portions thereof broken away to show its interior construction.
Figure 1:
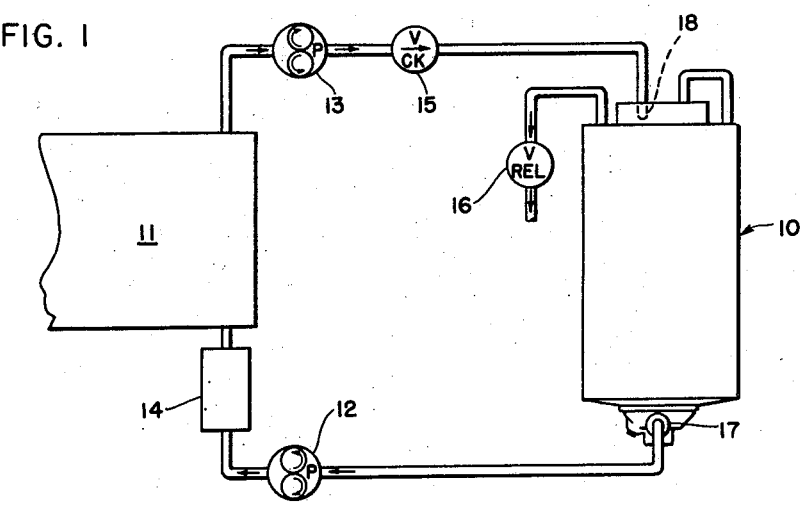
Figure 1 is a diagrammatic view of an aircraft engine oil circulating system, with the deaerating tank appearing in side elevation.

As shown in the diagram, Figure 1, the deaerating tank 10 is provided in the lubricating system of an engine 11. This system may include an inlet pump 12 for forcing oil under pressure into the engine lubricating system, an outlet or scavenging pump 13 for exhausting oil from the engine, a filter 14, a check valve 15, and, associated with tank 10, a relief valve 16. As will be understood from the diagram the pumps force the oil circulation from the tank oil outlet 17, through pump 12, filter 14, the lubricant passages in engine 11, pump 13 and check valve 15 to the tank oil inlet 18. As the oil passes through the engine it will entrain air and other gases, so that the oil passing through pump 13 and check valve 15 contains a considerable amount of froth or, in an extreme case, may consist entirely of froth. This oil circulating system is shown and described merely as one typical example of a system in which the oil tank shown in detail in Figures 2 to 5 may be advantageously employed.

The tank 10 comprises a container 19 to whose upper wall 21 an upper deaerator casing section 22 is secured by screws 20. Depending from section 22 into container 19 is a lower deaerator casing section 23. Sections 22 and 23 define the walls of a cylindrical upper chamber 24 which, as will appear from Figures 3 and 4, is eccentrically disposed relative to the lower or reserve oil chamber 25 within container 19.

As shown in Figure 3 the tank inlet passage 17 opens tangentially into the upper chamber 24. Concentric with the latter is an air outlet opening through the top wall of section 22, which communicates through a fitting 27, a tube 28 and a fitting 29 with an opening through container top wall 21 into chamber 25. Beneath fitting 29 is a plug having a metering orifice 31 for a purpose to be hereinafter described. Also communicating with chamber 25 through container top wall 21 is a gas relief conduit 32 in which is disposed the relief valve 16 for maintaining a suitable gas pressure within the chamber 25.

Secured in depending relation to the casing section 23, and preferably arranged concentrically within chamber 25, is a tubular hopper or warm-up chamber 34. As shown in Figures 4 and 5 the side and bottom walls of deaerator casing section 23 are provided with an opening 35 through which oil may pass downwardly and in a substantially tangential path from chamber 24 into the hopper 34. A baffle 36 extended upwardly from the hopper along the side of casing section 23, but terminating below top container wall 21, provides an escape passage 37 into chamber 25 for any gas which might otherwise be entrapped within the hopper and serves to equalize the gas pressures within chamber 25 and the hopper.

The lower end of the hopper 34 opens into the chamber 25 slightly above the bottom wall of container 19, as is shown in Figure 5. Guide vanes 38 in the lower end of the hopper compel change of motion of the oil passing thereby from swirling to substantially straight line flow and thereby reduce turbulence at the tank outlet 17.

In operation it will be understood that oil and gas comprising a froth, or a mixture of froth and oil, will enter the tank through oil inlet 18 at a relatively high velocity. The tangential entrance of this material will cause it to swirl rapidly within chamber 24, the resulting centrifugal force causing separation of the gas from the oil. The deaerated and hence more dense oil will flow downwardly in a spiral path, exhausting through opening 35 into the hopper 34. Gas separating from the oil in the chamber 24 will move toward the center of the latter and will then exhaust through fitting 27, tube 28 and fitting 29 into chamber 25. Such exhaust flow is restricted by metering orifice 31 which discourages ebullition of oil froth through this passage into chamber 25.

Any gas which may be carried with or in the oil through passage 35 into hopper 34 can escape through vent passages 37 into the top of chamber 25. Likewise the gas pressure in chamber 25 is effective through passage 37 upon the column of oil in the hopper, this pressure being effective to maintain the desired rate of flow of oil from the hopper through outlet 17 into the oil circulating system.

As shown in Figure 5, the bottom of the hopper is spaced from the bottom wall of container 19 to allow make-up oil to pass from chamber 25 into the outlet 17 to replace oil consumed in engine 11 or otherwise lost from the oil circulation system. With this arrangement, in which the make-up oil is held away from the normal path of oil circulation, the circulating oil is brought up to normal operating temperature more quickly after the engine is started than would otherwise be the case.

The relief valve 16, which may be of any suitable construction, serves to maintain the desired gas pressure within the chamber 25 and hopper 34, for the purpose referred to hereinbefore, namely, for urging oil from the tank into the line leading to pump 12 and engine 11. This valve may be designed to open at one predetermined pressure, or, if desired, may be of the adjustable type so that the gas pressure in the tank may be adjusted to obtain the desired rate of oil flow from the tank when using oils of different viscosities, for example.

Periodic cleaning of the tank is facilitated by the construction shown. As will be seen, upon disconnection of the tube 28 at fitting 27 or 29, and removal of screws 20, the deaerator casing and hopper may be removed as a single unit from the outer container 19.

It will be understood that the system and tank structure herein illustrated and described may be modified in various ways, and that the tank may be used in various kinds of liquid systems, without departing from the spirit of the invention or from the scope of the appended claims.

I claim as my invention:

1. A tank comprising a deaerating chamber and a reserve chamber, a hopper beneath said deaerating chamber and with the reserve chamber, a fluid inlet opening tangentially into an upper portion of the deaerating chamber, a tangential opening from the bottom of the deaerating chamber into an upper portion of the hopper, the hopper and the reserve chamber opening at their bottom portions into a liquid outlet, liquid guide vanes in the hopper adjacent said liquid outlet, a restricted gas passage from the upper central portion of the deaerating chamber into the upper portion of the reserve chamber, a vent between the upper portion of the hopper and the upper portion of the reserve chamber, and a gas exhaust passage from said upper portion of the reserve chamber into the outside atmosphere, said gas exhaust passage being provided with a relief valve to maintain a predetermined gas pressure within said chambers and hopper.

2. A tank comprising a deaerating chamber and a reserve chamber, a hopper beneath said deaerating chamber, a liquid inlet opening tangentially into the upper portion of the deaerating chamber, a tangential opening from the bottom of the deaerating chamber into the upper portion of the hopper, the hopper and the reserve chamber opening at the bottom portions thereof into a liquid outlet, a restricted gas passage from the upper central portion of the deaerating chamber into the upper portion of the reserve chamber, a vent between upper portion of the hopper into the upper portion of the reserve chamber, and a gas exhaust passage from said upper portion of the reserve chamber, said gas exhaust passage being provided with a relief valve to maintain a predetermined pressure within said chambers and hopper.

3. A tank comprising a deaerating chamber and a reserve chamber, a hopper beneath said deaerating chamber, a liquid inlet opening tangentially into the upper portion of the deaerating chamber, a tangential opening from the bottom of the deaerating chamber into the upper of the hopper, the hopper and the reserve chamber opening at the bottom portions thereof into a liquid outlet, a gas passage from the upper central portion of the deaerating chamber into the upper portion of the reserve chamber, a vent between upper portion of the hopper into the upper portion of the reserve chamber, a gas exhaust passage from said upper portion of the reserve chamber, and means in said gas exhaust passage to maintain gas pressure within said chambers and hopper.

4. A tank comprising an outer container having an opening in the upper wall thereof, a casing extending through said opening, means detachably securing said casing to said upper wall, said casing forming a cylindrical chamber and a fluid inlet passage opening tangentially into the upper portion of the chamber, a cylindrical hopper depending from the casing and having an open lower end adjacent the bottom of said container, a fluid passage opening substantially tangentially from the lower portion of the chamber into said hopper, a fluid outlet passage from the bottom of said container adjacent the lower end of the hopper, a passage for gas from the upper central portion of said chamber into the upper portion of the container interior, means in said passage for restricting flow therethrough a gas exhaust passage from said upper portion of the container interior, and means associated with said exhaust passage for limiting the maximum pressure within the tank.

5. A tank comprising an outer container having an opening in the upper wall thereof, a casing extending through said opening, means detachably securing said casing to said upper wall, said casing forming a cylindrical chamber and a fluid inlet passage opening tangentially into the upper portion of the chamber, a cylindrical hopper depending from the casing and having an open lower end adjacent the bottom of said container, a fluid passage opening substantially tangentially from the lower portion of the chamber into said hopper, a fluid outlet passage from the bottom of said container adjacent the lower end of the hopper, a passage for gas from the upper central portion of said chamber into the upper portion of the container interior, and a gas exhaust passage from said upper portion of the container interior.

6. A tank comprising a fluid reserve chamber, a cylindrical chamber adjacent the upper portion of the reserve chamber, a fluid inlet passage opening tangentially into the upper portion of the cylindrical chamber, a hopper beneath said cylindrical chamber and within said reserve chamber, said hopper having an open lower end adjacent the bottom of said reserve chamber, a fluid passage opening substantially tangentially from the lower portion of the cylindrical chamber into said hopper, a fluid outlet passage from the bottom of said reserve chamber adjacent the lower end of the hopper, a passage for gas from the upper central portion of said cylindrical chamber into the upper portion of said reserve chamber, a gas exhaust passage from said upper portion of the container interior, and means associated with said exhaust passage for limiting the maximum pressure within the tank.

7. A tank comprising a fluid reserve chamber, a cylindrical chamber adjacent the upper portion of the reserve chamber, a fluid inlet passage opening tangentially into the upper portion of the cylindrical chamber, a hopper beneath said cylindrical chamber and within said reserve chamber, said hopper having an open lower end adjacent the bottom of said reserve chamber, a fluid passage opening substantially tangentially from the lower portion of the cylindrical chamber into said hopper, a fluid outlet passage from the bottom of said reserve chamber adjacent the lower end of the hopper, a passage for gas from the upper central portion of said cylindrical chamber into the upper portion of said reserve chamber and a gas exhaust passage from said upper portion of the container interior.

8. A tank comprising a fluid reserve chamber, a cylindrical deaerator chamber adjacent the upper portion of the reserve chamber, a fluid inlet passage opening tangentially into the upper portion of the deaerator chamber, a hopper beneath the deaerator chamber and having an open lower end within the bottom portion of the reserve chamber, a fluid passage opening from the lower portion of the deaerator chamber into the hopper, a fluid outlet from the bottom of the reserve chamber adjacent the lower end of the hopper, a passage for gas from the upper central portion of the deaerator chamber, a gas exhaust passage from the upper portion of said reserve chamber, and means associated with said exhaust passage for limiting the maximum pressure within the tank.

GLENN B. DAVIS.

REFERENCES CITED

The following references are of record in the file of this patent:

UNITED STATES PATENTS

| Number | Name | Date |
| --- | --- | --- |
| 1,897,332 | Raymond | Feb. 14, 1933 |
| 1,917,606 | Sillers | July 11, 1933 |
| 2,106,589 | Bigger et al. | Jan. 25, 1938 |
| 2,188,801 | Worth | Jan. 30, 1940 |
| 2,316,729 | Tryon | Apr. 13, 1943 |
| 2,326,051 | Miller | Aug. 3, 1943 |
| 2,337,449 | Catteneo et al. | Dec. 21, 1943 |